United States Patent [19]

Vago et al.

[11] 4,250,759
[45] Feb. 17, 1981

[54] DIGITAL READOUT GAUGE

[75] Inventors: Otto Z. Vago, Burns; Frank S. Irlinger, Nashville, both of Tenn.

[73] Assignee: Scovill Manufacturing Company, Dickson, Tenn.

[21] Appl. No.: 96,501

[22] Filed: Nov. 21, 1979

Related U.S. Application Data

[63] Continuation-in-part of Ser. No. 3,506, Jan. 15, 1979, abandoned, which is a continuation of Ser. No. 850,036, Nov. 9, 1979, abandoned.

[51] Int. Cl.³ .............................................. G01L 9/08
[52] U.S. Cl. ........................................ 73/723; 73/754
[58] Field of Search .............. 73/717, 723, 754, 146.8, 73/777, DIG. 4

[56] References Cited

U.S. PATENT DOCUMENTS

| | | | |
|---|---|---|---|
| 3,657,926 | 4/1972 | Munson et al. | 73/724 |
| 3,762,223 | 10/1973 | Feuer et al. | 73/724 |
| 3,777,828 | 12/1973 | Dietemeyer | 177/165 |
| 3,795,284 | 3/1974 | Mracek et al. | 177/144 |
| 3,831,687 | 8/1974 | Maffia et al. | 177/210 |
| 3,886,473 | 5/1975 | Heyck | 331/42 |
| 3,889,104 | 6/1975 | Smith | 73/724 |
| 4,048,848 | 9/1977 | Dybel | 73/DIG. 4 |
| 4,073,187 | 2/1978 | Avdeef | 73/DIG. 4 |

Primary Examiner—Donald O. Woodiel
Attorney, Agent, or Firm—Pearne, Gordon, Sessions, McCoy & Granger

[57] ABSTRACT

A digital readout gauge is disclosed which, for example, may be a tire pressure gauge which is mounted in a small portable housing. A pressure chamber is formed within the housing with a valve core deflator mounted within the housing to depress the core of a standard tire valve and permit the air pressure within the tire to be introduced into the chamber. A wall of the chamber is movable with changes of pressure and a piezoelectric crystal transducer or strain gauge transducer is mounted to be stressed in accordance with movement of this wall to develop an analog voltage in accordance with the air pressure. An electrical circuit is contained within the housing and energizable by a battery carried within the housing. A power switch is actuated to an on condition by movement of the gauge onto the tire valve to energize the electrical circuit with the analog voltage passed to an analog-to-digital converter and then to a digital readout display to display the digital value of the air pressure within the tire. The foregoing abstract is merely a resume of one general application, is not a complete discussion of all principles of operation or applications, and is not to be construed as a limitation on the scope of the claimed subject matter.

21 Claims, 7 Drawing Figures

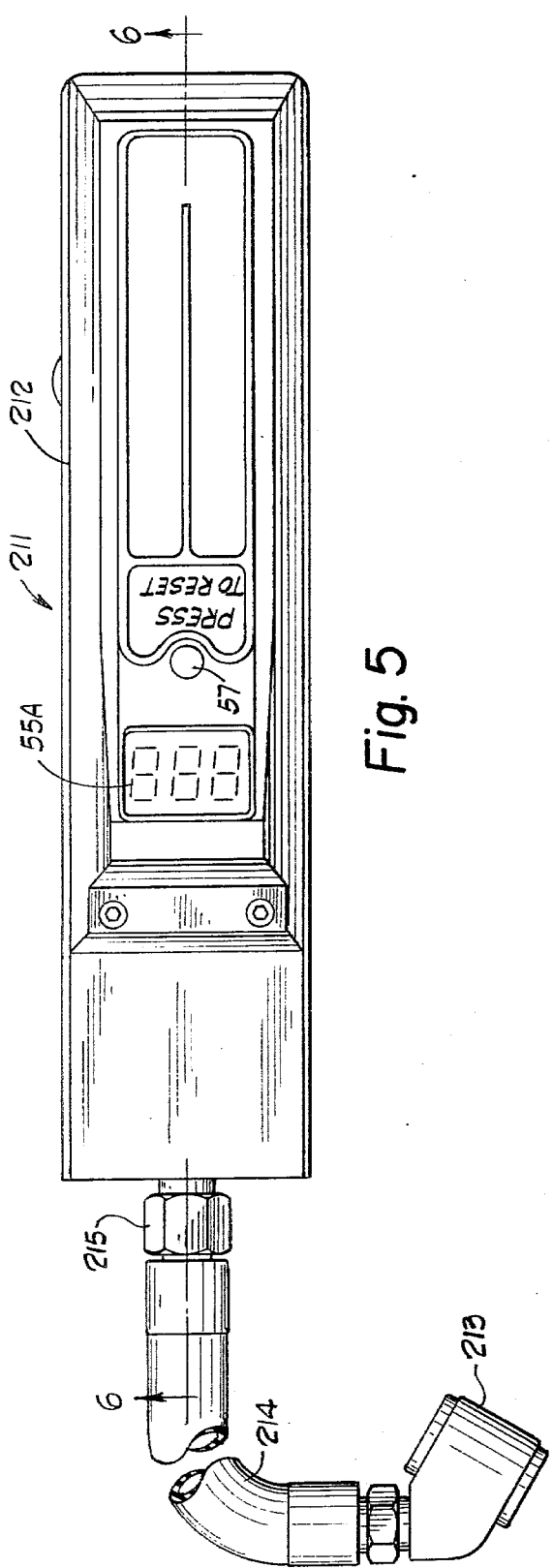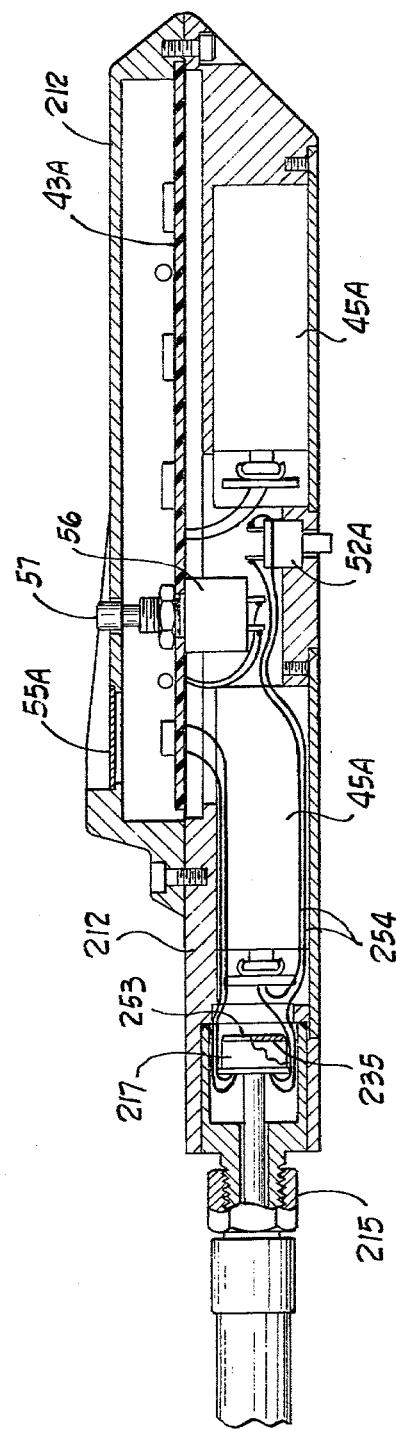

DIGITAL READOUT GAUGE

BACKGROUND OF THE INVENTION

This application is a continuation-in-part of application Ser. No. 003,506, filed Jan. 15, 1979, now abandoned, which is a continuation of application Ser. No. 850,036, filed Nov. 9, 1979, now abandoned.

Digital gauges have been used in the prior art, for example, a weighing scale with a digital readout and also fluid pressure measurement devices with a digital readout. Several systems have used a load cell to develop a voltage proportional to the weight of an object but many of these devices have been large and cumbersome and quite expensive. Other systems have used pressure transducers or a variable electrode capacitor but all have been relatively large and cumbersome and required excessive electrical energy.

Accordingly, the problem to be solved is how to achieve a small, compact, portable digital readout force gauge which is accurate and yet requires a minimum of electrical energy input.

SUMMARY OF THE INVENTION

This problem may be solved by a digital readout gauge, comprising, in combination, a housing, a chamber in said housing, wall means in said chamber movable with changes of force on said wall means, means to apply a changeable force on said wall means, an electrical circuit in said housing, a battery in said housing and connected to supply power to said electrical circuit, said electrical circuit including a transducer mounted to be stressed in accordance with movement of said movable wall means, output conductors connected to said transducer to generate an analog voltage thereacross upon stressing of said trnsducer, an analog-to-digital converter connected to receive a voltage in accordance with the voltage on said output conductors to convert the analog signal of said transducer voltage output into a digital signal, and a digital readout display connected to the output of said converter to display a digital value in accordance with the transducer voltage output.

An object of the invention is to provide a digital readout gauge which may be hand held and a portable self-contained unit.

Another object of the invention is to provide a digital readout tire pressure gauge.

Another object of the invention is to provide a digital readout force gauge utilizing a piezoelectric crystal.

Another object of the invention is to provide a digital readout force gauge utilizing a strain gauge.

Other objects and a fuller understanding of the invention may be had by referring to the following description and claims, taken in conjunction with the accompanying drawing.

BRIEF DESCRIPTION OF THE DRAWING

FIG. 5 is a plan view of a modified gauge;

FIG. 6 is a sectional view on line 6—6 of FIG. 5; and

DESCRIPTION OF THE PREFERRED EMBODIMENTS

Figure 1:
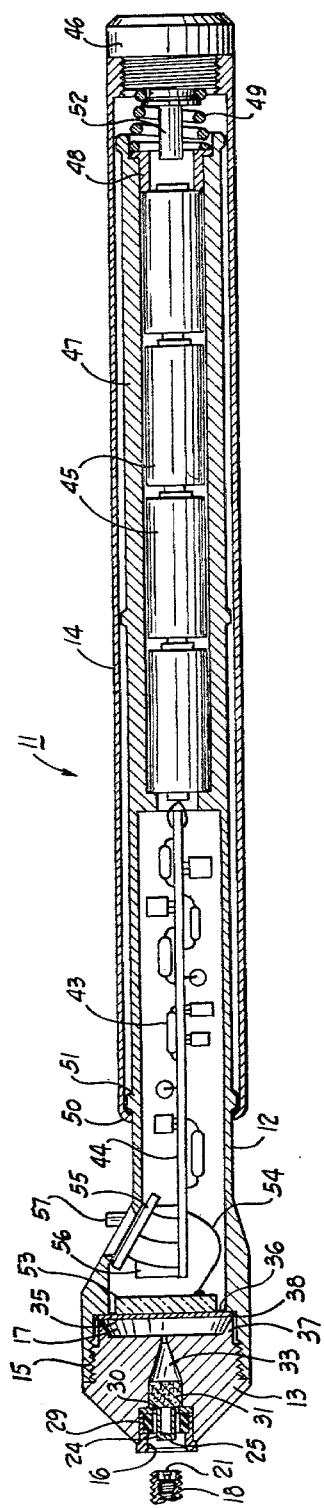
FIG. 1 is a longitudinal, sectional view of the digital readout gauge embodying the invention.
Figure 2:
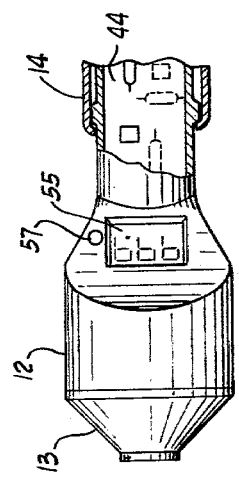
FIG. 2 is a partial top view, partly in section, of the gauge of FIG. 1.

FIGS. 1 and 2 show the mechanical construction of a digital readout gauge 11, which in this embodiment is a portable self-contained unit. The gauge 11 includes a housing 12 and this housing includes a sleeve-like handle 14 telescoped over part of the housing. The housing also includes a nosepiece 13 secured to the housing in any suitable manner such as the threads 15. The nosepiece 13 has a valve mouth 16 leading to a pressure chamber 17. The valve mouth 16 is adapted to be slidably applied to and over an ordinary tire valve 18 having the usual depressable valve core 21 to open the valve mechanism itself.

A valve deflator 24 has a central axial projection 25 to engage and depress the end of the valve core 21. The valve deflator 24 carries a seal washer 29 which slidably seals against the internal bore of the valve mouth 16 and also resiliently seals against the end of the tire valve 18 to seal the air pressure from the tire within the pressure chamber 17. This air under pressure is admitted to the chamber 17 through apertures 30 in the valve deflator 24 and through a filter 31.

A conduit 33 leads from the valve deflator 24 to the chamber 17.

A movable wall 35 is provided in the pressure chamber 17 and in this embodiment this movable wall is a metal diaphragm 36 clamped between an annular ring 37 on the nosepiece 13 and a shoulder 38 on the housing 12.

An electrical circuit 43 is provided within the housing 12 and this electrical circuit may include integrated circuits and other miniature components mounted on a printed circuit board 44 slidably received in slots in the housing 12. One or more batteries 45 may be provided within the housing with access to the batteries through a removable plug 46 in the handle 14. The batteries provide the electrical power to operate the electrical circuit 44.

The housing 12 includes an inner sleeve 47 within the telescoping tubular handle 14. A flanged bushing 48 is provided in the end of the inner sleeve 47, and a spring 49 acts between the bushing 48 and the plug 46, urging the handle 14 rearwardly. This is resisted by an inwardly turned shoulder 50 on handle 14 engageable with an abutment 51 on the housing 12. A switch extension 52 is provided on the plug 46 to engage the rearmost battery 45 upon the gauge being pressed against the valve 18.

A transducer, shown as a piezoelectric crystal 53, is mounted to be stressed in accordance with movement of the movable wall or diaphragm 36. In this embodiment the crystal 53 is mounted in a suitable manner to the diaphragm, as by soft solder. Conductors are mounted to receive voltage from the crystal and this may be one conductor 54 connected to one face and another conductor connected to the opposite face, which conveniently may be a connection to the metal diaphragm 36 through the metal housing 12. A digital readout display 55 is provided in the housing 12, as better shown in FIG. 2. A reset switch 56 is provided in the housing 12 to reset the digital display to zero with the switch button 57 accessible from the exterior of the housing 12.

The closing of the extension 52 onto the rearmost battery 45 is a power switch which enables the readout display 55. In the preferred embodiment, the closing of this switch 52 energizes the entire electrical circuit 43.

Figure 3:
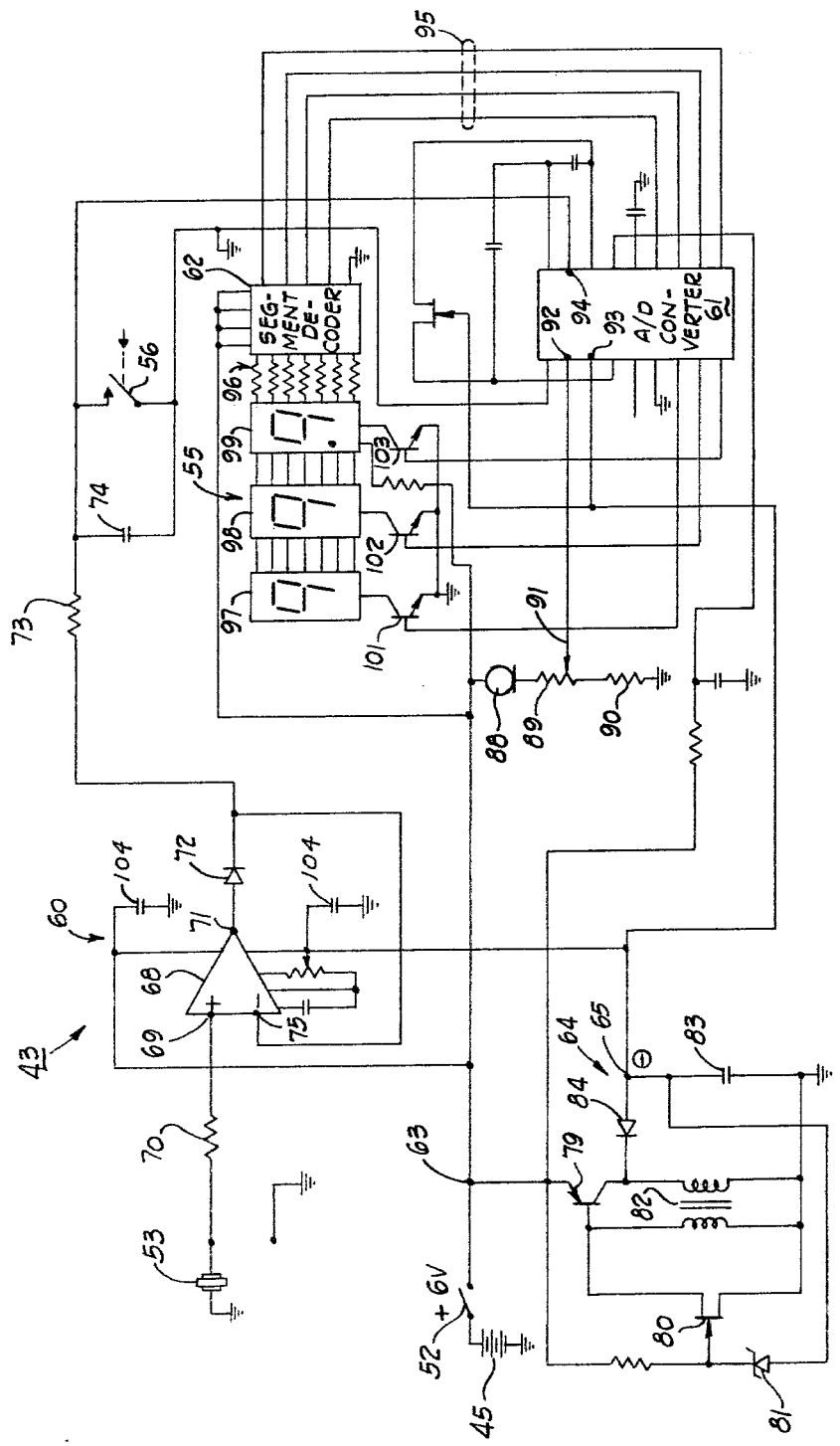
FIG. 3 is a schematic diagram of the electrical circuit used in the digital gauge.

FIG. 3 illustrates one preferred embodiment of the electrical circuit 43. This electrical circuit includes generally the crystal 53 supplying a peak detector 60 in turn supplying an output to an analog-to-digital converter 61 and this supplies a digital signal to a segment decoder 62 which supplies the segment driving signals to the digital readout display 55.

The battery 45 supplies electrical energy to power the electrical circuit 43 through the power switch 52 to a voltage terminal 63. This is a positive voltage terminal supplying the peak detector 60, digital display 55 and segment decoder 62. This positive voltage terminal 63 also supplies a DC to DC converter 64 which has a negative output voltage terminal 65 supplying negative operating voltages to the peak detector 60 and primarily to the analog-to-digital converter 61.

The peak detector 60 includes an operational amplifier 68 having positive and negative power supply terminals connected to the positive and negative voltage terminals 63 and 65, respectively. A non-inverting input terminal 69 is connected through a resistor 70 to the output of the crystal 53. An output terminal 71 of the operational amplifier 68 is connected through a forward conducting diode 72 and resistor 73 to a capacitor 74 to ground. Due to the diode 72, only positive outputs are supplied to the capacitor 74 which charges to the peak value of the output of the crystal 53, as multiplied by the gain of the operational amplifier 68. The output after the diode 72 is returned as a feedback connection to the inverting terminal 75 to establish the action of the operational amplifier 68 as a detector. The reset switch 56 is connected across the capacitor 74 to discharge this capacitor and reset the digital display 55 to zero.

The DC to DC converter 64 is utilized to provide a negative operating voltage at the terminal 65 and thus avoid the requirement for an additional battery to supply a negative operating voltage to the analog-to-digital converter 61. This DC to DC converter 64 is supplied with a positive operating voltage from the terminal 63 and includes a transistor 69, a field effect transistor 80, Zener diode 81, transformer 82, capacitor 83, and diode 84. The circuit acts as a high efficiency blocking oscillator-type converter. The self-oscillation charges the capacitor 83 and when the voltage across this capacitor reaches a value equal to the sum of the Zener voltage plus the pinch-off voltage of the FET transistor 80, then the oscillations cease. The circuit resumes oscillation when the output voltage falls below this value and it will be noted that the voltage across the capacitor 83 is the voltage at the negative output terminal 65.

The positive voltage supply terminal 63 supplies operating voltage to a circuit regulator 88 with the output connected through a potentiometer 89 and a resistor 90 to ground. The tap 91 of the potentiometer 89 is connected to supply current regulated power to the analog-to-digital converter 61 at a terminal 92. Terminal 93 of this converter 61 is connected to the negative operating voltage terminal 65. This converter 61 has an input at terminal 94 from the peak detector 60. It has a digital output on the lines 95 to the segment decoder 62. The output on these lines 95 is a digital output in a binary code of first, second, and third bits relative to a common or logic zero conductor. This binary code digital information is supplied to the segment decoder 62 which supplies the necessary signals through seven coupling resistors 96 to the seven-segment display numerals 97-99 of the digital readout display 55. The segment decoder 62 is a binary-to-decimal decoder changing the binary digital information into decimal type information for easy reading on the digital display 55. This also provides a floating decimal point indication with a reading of 0.10 to 99.9.

The display numerals 97-99 are each connected through a driver transistor 101-103, respectively, to ground. The bases of these transistors 101-103 are connected to the A/D converter 61 to turn on these transistors at the appropriate time to drive these numerals 97-99.

Capacitors 104 on the positive and negative supply voltage sources may be used to retain operating voltages for a time, e.g., five seconds, after the power switch 52 is opened. This permits continuous readout for a time on the display 55.

In one practical circuit constructed in accordance with the teachings of the invention, the peak detector 60 utilizes an RCA CA3130 model operational amplifier, the current regulator 88 was a Siliconix, Inc. CRO33 regulator, the A/D converter 61 was a Siliconix, Inc. LD130, and the segment decoder 62 was a Texas Instruments, Inc. 74C48.

OPERATION

The digital readout gauge 11 is usable as an extremely portable self-contained force gauge. Force applied to the movable wall 35 results in stressing the piezoelectric crystal 53 to develop a voltage on the output conductors 54. In the embodiment shown the gauge 11 is a pressure gauge and utilizes the pressure chamber 17. This chamber normally has only atmospheric pressure therein which is taken as the zero condition. When the gauge 11 is applied to a tire type valve 18, for example, then the air pressure within the structure, such as a tire, is applied to the pressure chamber 17. This occurs because the valve mouth 16 is slid over the valve 18 and the deflator projection 25 engages and depresses the valve core 21. At the same time, the seal washer 29 engages the end of the valve stem to seal the combined valve and pressure chamber 17 against external leakage. The resilience of the seal washer 29 accepts slight differences in geometry of various valves 18. The telescoping of the housing 12 inside the handle 14 actuates the power switch 52. The closing of this switch permits illumination of the display 55, and in the preferred embodiment energizes the electrical circuit 43 contained within the housing 12 and shown schematically in FIG. 3.

Let it be assumed that the pressure within the vessel to which the valve 18 is connected is 28.2 psi. This fluid pressure is passed through the aperture 30 into the pressure chamber 17 to move the diaphragm 36. This stresses the piezoelectric crystal transducer 53 and develops an analog voltage thereon proportional to this pressure. The closing of the power switch 52 by application of the gauge to the valve has energized the electrical circuit 43 shown in FIG. 3. Accordingly, the analog voltage developed by the crystal 53 will be passed to and amplified by the operational amplifier 68 connected as a peak detector 60. In one circuit constructed with the invention, the output of the crystal 53 was one millivolt per pound per square inch and accordingly, in the example above, the output of the crystal would be 28.2 millivolts. This voltage is amplified by the amplifier 68 and passed to charge the capacitor 74. Even if the peak value of the pressure within the pressure chamber 17 decreases, the peak reading remains for a long period of time. This might be as much as ten minutes if desired. The reading may be stored as a charge on the capacitor 74 and the impedance value of this capacitor is decreased to shorten the time of holding this peak value. If another force or pressure is to be measured shortly after the first such measurement, then the reset switch 56 should be closed momentarily to discharge the capacitor 74. Otherwise, the charge on this capacitor would only slowly decay and a false reading could be given if the second force or pressure is less than the first. This is true even though the power switch 52 is deactivated and again reactivated for the second measurement. This deactivation of the power switch 52 will deenergize the entire circuit 43, after a short time period to discharge capacitors 104, but does not discharge the capacitor 74.

The peak reading, in the above example 28.2 psi, is passed to the A/D converter 61. This is an analog voltage which is converted into a digital voltage in the form of binary bits on the conductors or lines 95. The segment decoder 62 is a binary-to-decimal converter which converts this binary coded information into a decimal information to drive the display numerals 97-99 of the digital readout display 55. In the above example, the numerals 28.2 will be displayed on the readout display 55 during energization of this circuit 43. If the gauge 11 is continuously applied to valve 18 and the reset switch 56 closed, then this will short and discharge the capacitor 74 so that the display 55 reads 00.0. If the capacitors 104 are used, this permits a time period, e.g., five seconds, of continued energization of the entire circuit 43. Thus, if a person presses the gauge 11 to a tire valve, and then brings it closer to his eye to read the display 55, the display remains illuminated for a time even though the power switch 52 has opened.

Figure 4:
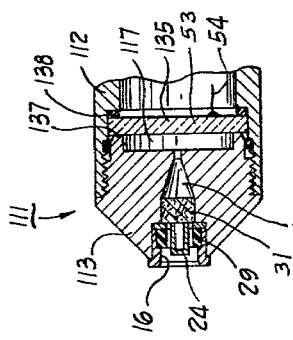
FIG. 4 is a longitudinal, sectional, partial view of a modification.

FIG. 4 illustrates a modified form of digital readout gauge 11 contained in the portable housing 112 having a nosepiece 113. Many parts may be the same as in the embodiment of FIGS. 1 and 2, such as the valve mouth 16, the valve deflator 24, seal washer 29, and filter 31. The conduit 33 leads to a pressure chamber 117 which has a movable wall 135 and in this particular embodiment the movable wall 135 is the piezoelectric crystal 53 itself. This crystal is secured between a shoulder 137 on the nosepiece 113 and a resilient washer 138 in the housing 12. The force within this pressure chamber 117 acts directly on the crystal 53 to move and stress this crystal so as to develop an output voltage on the output conductors 54 thereof. The remainder of the components may be the same as in the gauge 11 of FIGS. 1 and 2.

FIGS. 5 and 6 illustrate a further embodiment of the invention and illustrate a digital readout gauge 211 having a housing 212. In this embodiment, an air chuck 213 is connected by a hose 214 and a hose coupling 215 to the forward end of the housing 212. The pressure from the air chuck leads through the hose into a pressure chamber 217, which has a movable wall 235 to which a transducer 253 is attached. In this embodiment, the transducer 253 is a strain gauge of four resistors connected in a Wheatstone bridge with four conductors 254.

The housing 212 has an on-off power switch 52A, a reset switch 56 with an externally available reset button 57 and a digital readout display 55A. An electrical circuit 43A is also contained within the housing 212.

Figure 7:
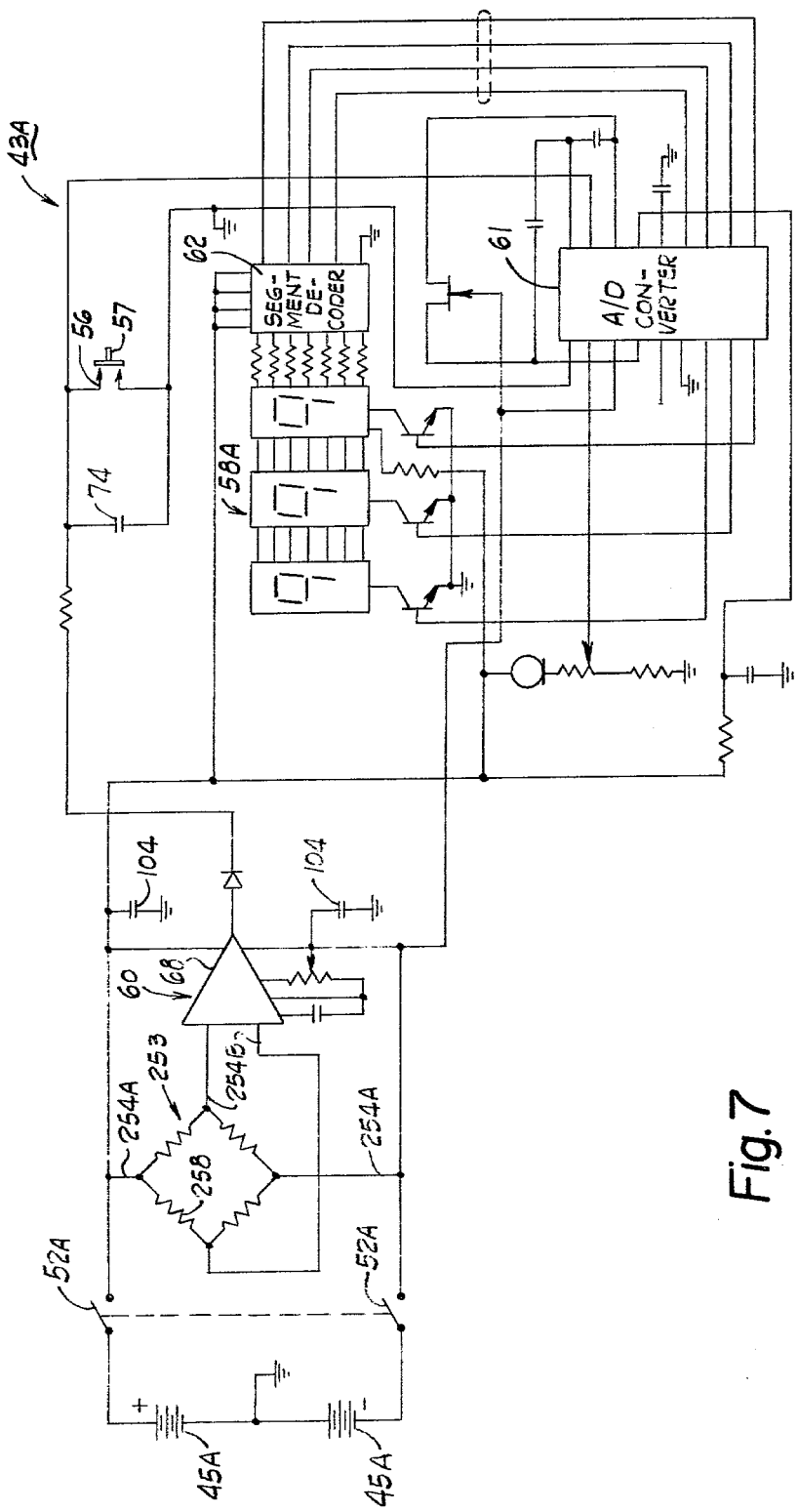
FIG. 7 is a schematic diagram of the electrical circuit used in the gauge of FIGS. 5 and 6.

FIG. 7 illustrates schematically the electrical circuit diagram of the circuit 43A and the transducer 253. As previously stated, the transducer 253 is a strain gauge including four resistances 258 connected in a Wheatstone bridge. In this embodiment, two different batteries 45A, e.g., nine-volt batteries, are utilized rather than one battery plus a DC to DC converter circuit, in order to achieve both positive and negative operating voltages relative to ground. The power switch 52A is a doublepole switch to supply power on the conductors 254A to the transducer 253 and also to supply power to the other components of the circuit which include generally the peak detector 60, the analog-to-digital converter 61, the segment decoder 62, and the digital readout display 55A, which components are similar to those in the circuit of FIG. 3. The transducer 253 has output conductors 254B which lead to the op amp 68 which is a part of the peak detector 60.

In operation, the circuit 43A operates in a manner quite similar to that of the circuit 43 of FIG. 3. The manually operated power switch 52 may be turned on and then the air chuck 213 applied to a tire valve in order that fluid pressure will act on the strain gauge transducer 253. This transducer is the type wherein two opposite legs of the bridge are stressed in tension and the other two legs are stressed in compression during pressure-induced deflection of the movable wall 235. This provides a large voltage swing on the output conductors 254B to be applied to the peak detector 60, and this voltage is retained by the charge on the capacitor 74. Even if the gauge 211 is removed from the tire valve to be closer to the user's eye for viewing, the power switch 52A will remain on, thus powering the entire circuit. The capacitor 74 retains the peak value until the readout is reset to zero by closing the reset switch 56.

The gauges 11, 111, and 211 illustrate a digital readout force gauge which displays a digital signal on the display 55 or 55A, which is proportional to an applied force, with the force being applied to stress the piezoelectric crystal 53 or strain gauge 253. In each of these gauges the transducer is mounted to be stressed in accordance with the movement of a movable wall and this wall is in a pressure chamber which can at least momentarily contain the fluid pressure. This contained fluid pressure stresses the movable wall and stresses the transducer. The entire gauge may be mounted in a very small and extremely portable housing 12, 112, or 212 to easily be applied to a tire valve 18, for example, to determine the amount of fluid pressure within this container to which the valve is attached. In FIGS. 1-4, the sleeve 47 telescopes inside the tubular handle 14, as resisted by the spring 49. The power switch 52 is actuated by a change from the first position to a second position of these two sleeves to energize the entire electrical circuit 43. This enables the digital readout display 55. In all embodiments, the peak detector 60 maintains the peak reading observed within the pressure chamber 17 or 217, regardless of whether this pressure might decrease after its initial maximum value. The reset switch 56 is connected to discharge the capacitor 74 so that the gauge is ready for measurement of another and smaller value of force.

The present disclosure includes that contained in the appended claims, a well as that of the foregoing description. Although this invention has been described in its preferred form with a certain degree of particularity, it is understood that the present disclosure of the preferred form has been made only by way of example and that numerous changes in the details of construction and the circuit and the combination and arrangement of parts and circuit elements may be resorted to without departing from the spirit and scope of the invention as hereinafter claimed.

What is claimed is:

1. A digital readout gauge, comprising, in combination,
a housing,
a chamber in said housing,
wall means in said chamber movable with changes of force on said wall means,
means to apply a changeable force on said wall means,
an electrical circuit in said housing,
a battery in said housing and connected to supply power to said electrical circuit,
said electrical circuit including a transducer mounted to be stressed in accordance with movement of said movable wall means,
output conductors connected to said transducer to generate an analog voltage thereacross upon stressing of said transducer,
an analog-to-digital converter connected to receive a voltage in accordance with te voltage on said output conductors to convert the analog signal of said transducer voltage output into a digital signal,
and a digital readout display connected to the output of said converter to display a digital value in accordance with the transducer voltage output.

2. A digital readout gauge as set forth in claim 1, wherein said wall means in said chamber seals said chamber.

3. A digital readout gauge as set forth in claim 1, including means responsive to the application of force to one of said housing and chamber to enable said digital readout display.

4. A digital readout gauge as set forth in claim 1, including switch means actuated in accordance with said means to apply a changeable force on said wall means,
and means connecting said switch means in said electrical circuit to enable said digital readout display.

5. A digital readout gauge as set forth in claim 1, wherein said electrical circuit includes a segment decoder connected to the output of said converter and supplying an output to said digital readout display.

6. A digital readout gauge as set forth in claim 1, wherein said electrical circuit includes a DC to DC converter connected to said battery to establish a negative as well as a positive voltage relative to ground,
and means comprising said negative voltage output of said DC to DC converter to said analog-to-digital converter.

7. A digital readout gauge as set forth in claim 1, wherein said gauge is a pressure gauge,
and said means to apply a force on said wall means includes means to apply a fluid pressure to said chamber.

8. A digital readout gauge as set forth in claim 7, wherein said pressure gauge includes a standard adaptor in one end of said chamber and having a central deflator projection positioned to depress and open a valve core of a tire valve upon application of the adaptor to the tire valve.

9. A digital readout gauge as set forth in claim 8, wherein said chamber is a pressure chamber,
and including an annular seal washer surrounding said deflator projection to be engaged by any said tire valve to seal said pressure chamber to the tire valve.

10. A digital readout gauge as set forth in claim 8, including first and second telescoping sleeves in said housing,
spring means urging said sleeves from a first toward a second position,
switch means connected to be actuated upon relative movement of the sleeves to said first position,
said electrical circuit including means to connect said switch means to enable energization of said electrical circuit from said battery, whereby said switch means turns on said electrical circuit upon application of said adaptor to a tire valve.

11. A digital readout gauge as set forth in claim 1, wherein said electrical circuit includes a peak detector connected to detect the peak value of the analog signal from said transducer.

12. A digital readout gauge as set forth in claim 11, wherein said peak detector includes an operational amplifier connected to amplify the signal from said transducer,
and a diode connected to the output of said operational amplifier.

13. A digital readout gauge as set forth in claim 11, wherein said electrical circuit includes a capacitor connected to be charged to a given voltage.

14. A digital readout gauge as set forth in claim 13, wherein said capacitor provides an automatic turn-off to extinguish the digital display upon discharge of the capacitor.

15. A digital readout gauge as set forth in claim 14, wherein said electrical circuit includes a reset switch connected to discharge said capacitor to reset said digital display to substantially zero.

16. A digital readout gauge as set forth in claim 1, wherein said wall means includes a flexible metal diaphragm sealed in said chamber,
and said transducer is a crystal mounted on the side of said diaphragm remote from said chamber to be stressed upon movement of said wall means.

17. A digital readout gauge as set forth in claim 1, wherein said wall means is unitary with said transducer.

18. A digital readout gauge as set forth in claim 1, wherein said transducer is a strain gauge.

19. A digital readout force gauge, comprising, in combination,
a housing,
a digital readout display mounted in said housing,
an electrical circuit,
electrical terminal means energizable to supply power to said electrical circuit,
said electrical circuit including a transducer mounted to be stressed in accordance with an applied force,
output conductors connected to said transducer to have an analog voltage generated thereacross upon stressing of said transducer,
an analog-to-digital converter connected to receive a voltage in accordance with the voltage on said output conductors to convert the analog signal of said transducer voltage output into a digital signal,
a peak detector connected to receive the output of said transducer and having an output to said converter, and means connecting the output of said converter to said digital readout display to display a digital value in accordance with the transducer output.

20. A digital readout force gauge, comprising, in combination, a housing,
a digital readout display mounted in said housing,
an electrical circuit,
electrical terminal means energizable to supply power to said electrical circuit,
said electrical circuit including a transducer mounted to be stressed in accordance with an applifed force,
output conductors connected to said transducer to have an analog voltage generated thereacross upon stressing of said transducer,
an analog-to-digital converter connected to receive a voltage in accordance with the voltage on said output conductors to convert the analog signal of said transducer voltage output into a digital signal,
said electrical terminal means along a single polarity relative to ground,
a DC to DC converter to establish an operating voltage of the opposite polarity and connected to operate said circuit,
and means connecting the output of said converter to said digital readout display to display digital value in accordance with the transducer output.

21. A digital readout force gauge, comprising, in combination, housing means,
a digital readout display mounted in said housing means,
an electrical circuit,
electrical terminal means energizable to supply power to said electrical circuit,
a chamber in said housing means,
wall means in said chamber movable with changes of force on said wall means,
means to supply a changeable force on said wall means,
said electrical circuit including a transducer mounted to be stressed in accordance with movement of said wall means,
output conductors connected to said transducer to have an analog voltage generated thereacross upon stressing of said transducer,
an analog-to-digital converter connected to receive a voltage in accordance with the voltage on said output conductors to convert the analog signal of said transducer voltage output into a digital signal,
and means connecting the output of said converter to said digital readout display to display a digital value in accordance with the transducer output.

* * * * *

REEXAMINATION CERTIFICATE (1162nd)
United States Patent [19]
Vago et al.

[11] B1 4,250,759
[45] Certificate Issued  Dec. 5, 1989

[54] DIGITAL READOUT

[75] Inventors: Otto Z. Vago, Burns; Frank S. Irlinger, Nashville, both of Tenn.

[73] Assignee: Schrader Automotive, Inc., Nashville, Tenn.

Reexamination Request:
No. 90/001,748, Apr. 7, 1989

Reexamination Certificate for:
Patent No.: 4,250,759
Issued: Feb. 17, 1981
Appl. No.: 96,501
Filed: Nov. 21, 1979

Related U.S. Application Data

[63] Continuation-in-part of Ser. No. 3,506, Jan. 15, 1979, abandoned, which is a continuation of Ser. No. 850,036, Nov. 9, 1977, abandoned.

[51] Int. Cl.$^4$ .................. B60C 23/02; G01L 7/08; G01L 9/08
[52] U.S. Cl. ............... 73/723; 73/146.8; 73/754
[58] Field of Search ........... 73/146.8, 146.2, 146.5, 73/723, 726, 727; 340/442

[56] References Cited

U.S. PATENT DOCUMENTS

| | | | |
|---|---|---|---|
| 3,857,283 | 12/1974 | Jennings | 73/300 |
| 3,949,822 | 4/1976 | English et al. | 177/126 |
| 3,992,926 | 11/1976 | Burris et al. | 73/80 |
| 4,038,532 | 7/1977 | Berryhill | 73/345 |
| 4,119,944 | 10/1978 | Smith et al. | 73/146.5 |
| 4,160,234 | 7/1979 | Karbo et al. | 73/146.5 |
| 4,333,491 | 6/1982 | Knubley | 73/146.8 |

FOREIGN PATENT DOCUMENTS

| | | |
|---|---|---|
| 1027226 | 4/1966 | United Kingdom. |
| 1106200 | 3/1968 | United Kingdom. |
| 1161332 | 8/1969 | United Kingdom. |
| 1295144 | 11/1972 | United Kingdom. |
| 1432391 | 4/1976 | United Kingdom. |
| 1440188 | 6/1976 | United Kingdom. |
| 1482631 | 8/1977 | United Kingdom. |

*Primary Examiner*—Donald O. Woodiel

[57] ABSTRACT

A digital readout gauge is disclosed which, for example, may be a tire pressure gauge which is mounted in a small portable housing. A pressure chamber is formed within the housing with a valve core deflator mounted within the housing to depress the core of a standard tire valve and permit the air pressure within the tire to be introduced into the chamber. A wall of the chamber is movable with changes of pressure and a piezoelectric crystal transducer or strain gauge transducer is mounted to be stressed in accordance with movement of this wall to develop an analog voltage in accordance with the air pressure. An electrical circuit is contained within the housing and energizable by a battery carried within the housing. A power switch is actuated to an on condition by movement of the gauge onto the tire valve to energize the electrical circuit with the analog voltage passed to an analog-to-digital converter and then to a digital readout display to display the digital value of the air pressure within the tire. The foregoing abstract is merely a resume of one general application, is not a complete discussion of all principles of operation or applications, and is not to be construed as a limitation on the scope of the claimed subject matter.

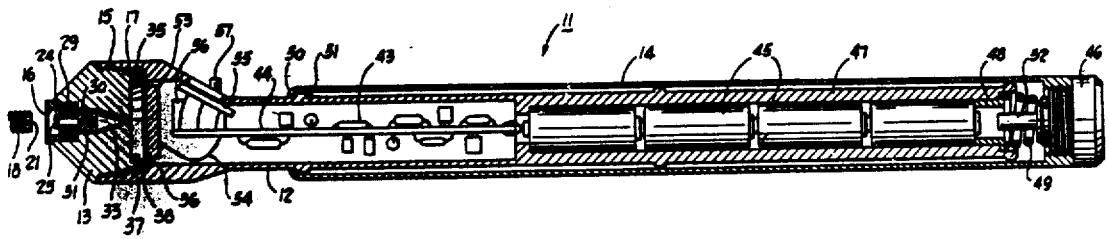

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 5–8:
This application is a continuation-in-part of application Ser. No. 003,506, filed Jan. 15, 1979, now abandoned, which is a continuation of application Ser. No. 850,036, filed [Nov. 9, 1979], *Nov. 9, 1977* now abandoned.

AS A RESULT OF REEXAMINATION, IT HAS BEEN DETERMINED THAT:

Claims 7–9 are cancelled.

Claims 1–6 and 10–21 are determined to be patentable as amended.

New claims 22–24 are added and determined to be patentable.

1. A digital readout *tire pressure* gauge, comprising, in combination,
   a housing,
   a chamber in said housing,
   wall means in said chamber movable with changes of force on said wall means,
   means to apply a changeable force on said wall means [,] *including means to apply a fluid pressure to said chamber,*
   *a standard adaptor in one end of said chamber and having a central deflator projection positioned to depress and open a valve core of a tire valve upon application of the adaptor to the tire valve,*
   an electrical circuit in said housing,
   a battery in said housing and connected to supply power to said electrical circuit,
   said electrical circuit including a transducer mounted to be stressed in accordance with movement of said moveable wall means,
   output conductors connected to said transducer to generate an analog voltage thereacross upon stressing of said transducer,
   an analog-to-digital converter connected to receive a voltage in accordance with [te] *the* voltage on said output conductors to convert the analog signal of said transducer voltage output into a digital signal,
   and a digital readout display connected to the output of said converter to display a digital value in accordance with the transducer voltage output.

2. A digital readout *tire pressure* gauge as set forth in claim 1, wherein said wall means in said chamber seals said chamber.

3. A digital readout *tire pressure* gauge as set forth in claim 1, including means responsive to the application of force to one of said housing and chamber to enable said digital readout display.

4. A digital readout *tire pressure* gauge as set forth in claim 1, including switch means actuated in accordance with said means to apply a changeable force on said wall means,
   and means connecting said switch in said electrical circuit to enable said digital readout display.

5. A digital readout *tire pressure* gauge as set forth in claim 1, wherein said electrical circuit includes a segment decoder connected to the output of said converter and supplying an output to said digital readout display.

6. A digital readout *tire pressure* gauge as set forth in claim 1, wherein said electrical circuit includes a DC to DC converter connected to said battery to establish a negative as well as a positive voltage relative to ground,
   and means comprising said negative voltage output of said DC to DC converter to said analog-to-digital converter.

10. A digital readout *tire pressure* gauge as set forth in claim [8] *1*, including first and second telescoping sleeves in said housing,
    spring means urging said sleeves from a first toward a second position,
    switch means connected to be actuated upon relative movement of the sleeves to said first position,
    said electrical circuit including means to connect said switch means to enable energization of said electrical circuit from said battery, whereby said switch means turns on said electrical circuit upon application of said adaptor to a tire valve.

11. A digital readout *tire pressure* gauge as set forth in claim 1, wherein said electrical circuit includes a peak detector connected to detect the peak value of the analog signal from said transducer.

12. A digital readout *tire pressure* gauge as set forth in claim 11, wherein said peak detector includes an operational amplifier connected to amplify the signal from said transducer,
    and a diode connected to the output of said operational amplifier.

13. A digital readout *tire pressure* gauge as set forth in claim 11, wherein said electrical circuit includes a capacitor connected to be charged to a given voltage.

14. A digital readout *tire pressure* gauge as set forth in claim 13, wherein said capacitor provides an automatic turn-off to extinguish the digital display upon discharge of the capacitor.

15. A digital readout *tire pressure* gauge as set forth in claim 14, wherein said electrical circuit includes a reset switch connected to discharge said capacitor to reset said digital display to substantially zero.

16. A digital readout *tire pressure* gauge as set forth in claim 1, wherein said wall means includes a flexible metal diaphragm sealed in said chamber,
    and said transducer is a crystal mounted on the side of said diaphragm remote from said chamber to be stressed upon movement of said wall means.

17. A digital readout *tire pressure* gauge as set forth in claim 1, wherein said wall means is unitary with said transducer.

18. A digital readout *tire pressure* gauge as set forth in claim 1, wherein said transducer is a strain gauge.

19. A digital readout [force] *tire pressure* gauge, comprising, in combination,
    a housing, a digital readout display mounted in said housing,
an electrical circuit,
electrical terminal means energizable to supply power to said electrical circuit,
said electrical circuit including a transducer mounted to be stressed in accordance with an applied [force] *tire pressure*,
output conductors connected to said transducer to have an analog voltage generated thereacross upon stressing of said transducer,
an analog-to-digital converter connected to receive a voltage in accordance with the voltage on said output conductors to convert the analog signal of said transducer voltage output into a digital signal,
a peak detector connected to receive the output of said transducer and having an output to said converter,
and means connecting the output of said converter to said digital readout display to display a digital value in accordance with the transducer output.

20. A digital readout [force] *tire pressure* gauge, comprising, in combination,
a housing,
a digital readout display mounted in said housing,
an electrical circuit,
electrical terminal means energizable to supply power to said electrical circuit,
said electrical circuit including a transducer mounted to be stressed in accordance with an applied [force] *tire pressure*,
output conductors connected to said transducer to have an analog voltage generated thereacross upon stressing of said transducer,
an analog-to-digital converter connected to receive a voltage in accordance with the voltage on said output conductors to convert the analog signal of said transducer voltage output into a digital signal,
said electrical terminal means being a single polarity relative to ground,
a DC to DC converter to establish an operating voltage of the opposite polarity and connected to operate said circuit,
and means connecting the output of said A/D converter to said digital readout display to display a digital value in accordance with the transducer output.

21. A digital readout [force] *tire pressure* gauge, comprising, in combination,
housing means,
a digital readout display mounted in said housing means,
an electrical circuit,
electrical terminal means energizable to supply power to said electrical circuit,
a *sealable fluid* pressure chamber in said housing means,
wall means in said chamber movable with changes of [force] *fluid pressure* on said wall means,
means *to seal said chamber against a tire valve* to supply a changeable force on said wall means,
said electrical circuit including a transducer mounted to be stressed in accordance with movement of said wall means,
output conductors connected to said transducer to have an analog voltage generated thereacross upon stressing of said transducer,
an analog-to-digital converter connected to receive a voltage in accordance with the voltage on said output conductors to convert the analog signal of said transducer voltage output into a digital signal,
and means connecting the output of said converter to said digital readout display to display a digital value in accordance with the transducer output.

22. *A digital readout tire pressure gauge, comprising in combination,*
*a housing,*
*a pressure chamber in said housing,*
*wall means in said chamber movable with changes of force on said wall means,*
*means to apply a changeable force on said wall means including means to apply a fluid pressure to said chamber,*
*a standard adapter in one end of said chamber and having a central deflator projection positioned to depress and open a valve core of a tire valve upon application of the adapter to the tire valve,*
*an annular seal washer surrounding said deflator projection to be engaged by any said tire valve to seal said pressure chamber to the tire valve,*
*a battery in said housing and connected to supply power to said electrical circuit,*
*said electrical circuit including a transducer mounted to be stressed in accordance with movement of said moveable wall means,*
*output conductors connected to said transducer to generate an analog voltage thereacross upon stressing of said transducer,*
*an analog-to-digital converter connected to receive a voltage in accordance with the voltage on said output conductors to convert the analog signal of said transducer voltage output into a digital signal,*
*and a digital readout display connected to the output of said converter to display a digital value in accordance with the transducer voltage output.*

23. *A digital readout tire pressure gauge, comprising, in combination, a housing open to atmospheric pressure,*
*a fluid pressure sealable chamber in said housing,*
*wall means in said chamber movable with changes of force on said wall means,*
*means to apply a changeable force on said wall means including means to apply a fluid pressure to said chamber,*
*a standard adapter in one end of said chamber and having a central deflator projection positioned to depress and open a valve core of a tire valve upon application of the adapter to the tire valve,*
*an electrical circuit in said housing,*
*a battery in said housing and connected to supply power to said electrical circuit,*
*said electrical circuit including a transducer mounted to be stressed in accordance with movement of said moveable wall means,*
*output conductors connected to said transducer to generate an analog voltage thereacross upon stressing of said transducer,*
*an analog-to-digital converter connected to receive a voltage in accordance with voltage on said output conductors to convert the analog signal of said transducer voltage output into a digital signal,*
*and a digital readout display connected to the output of said converter to display a digital value in accordance with the transducer voltage output.*

24. *A digital readout tire pressure gauge, comprising, in combination,*
*a housing,*
*a chamber in said housing,* wall means in said chamber movable with changes of force on said wall means, means to apply a changeable force on said wall means, an electrical circuit in said housing, a battery in said housing and connected to supply power to said electrical circuit, said electrical circuit including a transducer mounted to be stressed in accordance with movement of said moveable wall means, output conductors connected to said transducer to generate an analog voltage thereacross upon stressing of said transducer, an analog-to-digital converter connected to receive a voltage in accordance with the voltage on said output conductors to convert the analog signal of said transducer voltage output into a digital signal, a digital readout display connected to the output of said converter to display a digital value in accordance with the transducer voltage output, and means to maintain on said display the peak value of the signal from said transducer.

* * * * *